United States Patent [19]
Anderson et al.

[11] Patent Number: 5,950,615
[45] Date of Patent: Sep. 14, 1999

[54] POULTRY HOUSE HEATER

[75] Inventors: Gary L. Anderson, Rogers, Ark.; Bryan Cofer, Jacksboro, Tenn.

[73] Assignees: Sibley Industries, Inc., Anderson, Mo.; Lincoln Brass Works, Inc., Nashville, Tenn.

[21] Appl. No.: 08/787,531

[22] Filed: Jan. 21, 1997

[51] Int. Cl.[6] ........................................ F24C 3/00
[52] U.S. Cl. ................ 126/85 A; 126/92 B; 119/305; 119/307; 239/554; 239/555
[58] Field of Search ........................ 431/328, 329, 431/354, 355; 239/554, 555; 126/85 A, 92 B; 119/307, 305

[56] References Cited

U.S. PATENT DOCUMENTS

| | | | |
|---|---|---|---|
| 600,166 | 3/1898 | O'Rielly | 239/554 |
| 2,985,137 | 5/1961 | Horne | 119/307 |
| 3,429,306 | 2/1969 | Thompson | 126/92 |
| 3,563,206 | 2/1971 | Hermann | 119/32 |
| 3,691,996 | 9/1972 | Bowell | 119/32 |
| 3,777,985 | 12/1973 | Hughes et al. | 239/554 |
| 3,992,137 | 11/1976 | Streisel | 239/554 |
| 4,165,963 | 8/1979 | Nozaki | 431/354 |
| 4,919,084 | 4/1990 | Maurice | 119/32 |
| 5,328,357 | 7/1994 | Riehl | 431/354 |

OTHER PUBLICATIONS

Sibley Sierra Sales Brochure first used Jun. 1993, 4 pages.

*Primary Examiner*—Carroll B. Dority
*Attorney, Agent, or Firm*—Robert R. Keegan; Head, Johnson & Kachigian

[57] ABSTRACT

A gas burner assembly for a poultry house heater having a head that is fabricated from a metal stamping process. The gas burner has a venturi tube which extends between a burner orifice and a burner head. The burner head is manufactured from a top plate and a bottom plate. The top and bottom plates define about forty upper half and lower half burner ports wherein the lower half ports of the bottom plate are in registry with the upper half ports in the top plate to define the ports for the gas burner. The interior of the head is shaped to form a chamber around the junction with the venturi tube having a height greater than said ports, and the interior surface of the head is smooth and free of sharp edges. The top and bottom plates are mechanically connected by a series of tabs and slots formed on the top and bottom plates.

8 Claims, 3 Drawing Sheets

POULTRY HOUSE HEATER

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

1. Field of the Invention.

The present invention relates to the field of poultry house heaters and, more particularly, to an air-gas mixture burning radiant heater assembly for a poultry house heater that incorporates a gas burner manufactured from stamped metal.

2. Background of the Invention.

For many years the poultry industry has recognized the importance of providing growing birds with the ability to select the most comfortable temperature at any given moment. Radiant heating systems are used to create and control the microclimates that give birds this ability. Gas heating systems for poultry houses typically include a plurality of gas burner assemblies located throughout the poultry house.

Radiant gas burner assemblies typically used today are radiant screen-type burners that are spaced apart and suspended above a flock of growing birds within a structure such as a poultry house. Previously, radiant screen-type burner assemblies have utilized a cast iron multiport burner head that directs a burner flame to contact a frusto-conical screen located around the burner head. A reflector is positioned above the multiport burner head and above the frusto-conical screen which downwardly emits the heat in the form of infrared radiation toward the growing birds. Reflectors are typically constructed of aluminum. By placing a plurality of individual burner assemblies throughout the poultry house, the resultant environment is conducive to the growth of the birds.

A problem associated with the brooding systems of the poultry industry is that of airborne contaminants such as dust from the poultry house floor, dry feed, feathers and excrement from the chicks. These contaminants may become airborne with movement of the chicks, resulting in a dusty environment in the brooding house. The airborne contaminants cause prior art cast iron burners to suffer performance problems due to rough interior surfaces and irregular hole sizes that result from the casting process. Undersized ports, tiny crevices and irregular interior surface features of the burners may result in a build-up of dust and other contaminants that can negatively affect the heating performance of the burners and the emissions generated by the burners.

Attempts have been made to overcome these disadvantages of cast iron burners. Such attempts include resizing the ports by drilling and/or reaming the ports. Additionally, dust filter cans have been added. A disadvantage with such filter cans is that they require periodic cleaning. The additional machining operations as well as the addition of the dust filter cans and the continued maintenance of these systems add significantly to the cost of raising birds.

Dust collection and contamination also cause problems in the venturi tubes that supply fuel to the burners. Difficulties are encountered with horizontally installed venturi tubes and with vertically oriented orifice fittings that possess substantially large horizontal surfaces. Since the horizontal surface of an orifice fitting provides a settling station for airborne contaminants, such contaminants have a tendency to adversely affect the operation of the venturi tube and the orifice fitting. Performance difficulties in the venturi tube and orifice fitting in turn adversely affect the performance of the burner.

Accordingly, the continued development of radiant gas heaters for poultry house heating systems is directed to a lower cost burner that overcomes the problems associated with prior gas burner assemblies for poultry houses.

SUMMARY OF THE INVENTION

The present invention relates to a stamped burner for use in a poultry house air-gas mixture burning radiant heater assembly for poultry houses. The gas burner is fabricated from a precision metal stamping process to provide smooth interior surfaces and controlled port sizes. The resulting burner head is significantly lighter than prior art cast iron versions. Additionally, the stamped burner is mechanically joined rather than welded, thereby reducing the cost of manufacture.

Other advantages and objects of the present invention will become apparent to those skilled in the art from the subsequent detailed description, claims and drawings.

DETAILED DESCRIPTION OF THE PREFERRED EMBODIMENTS

Figure 1:
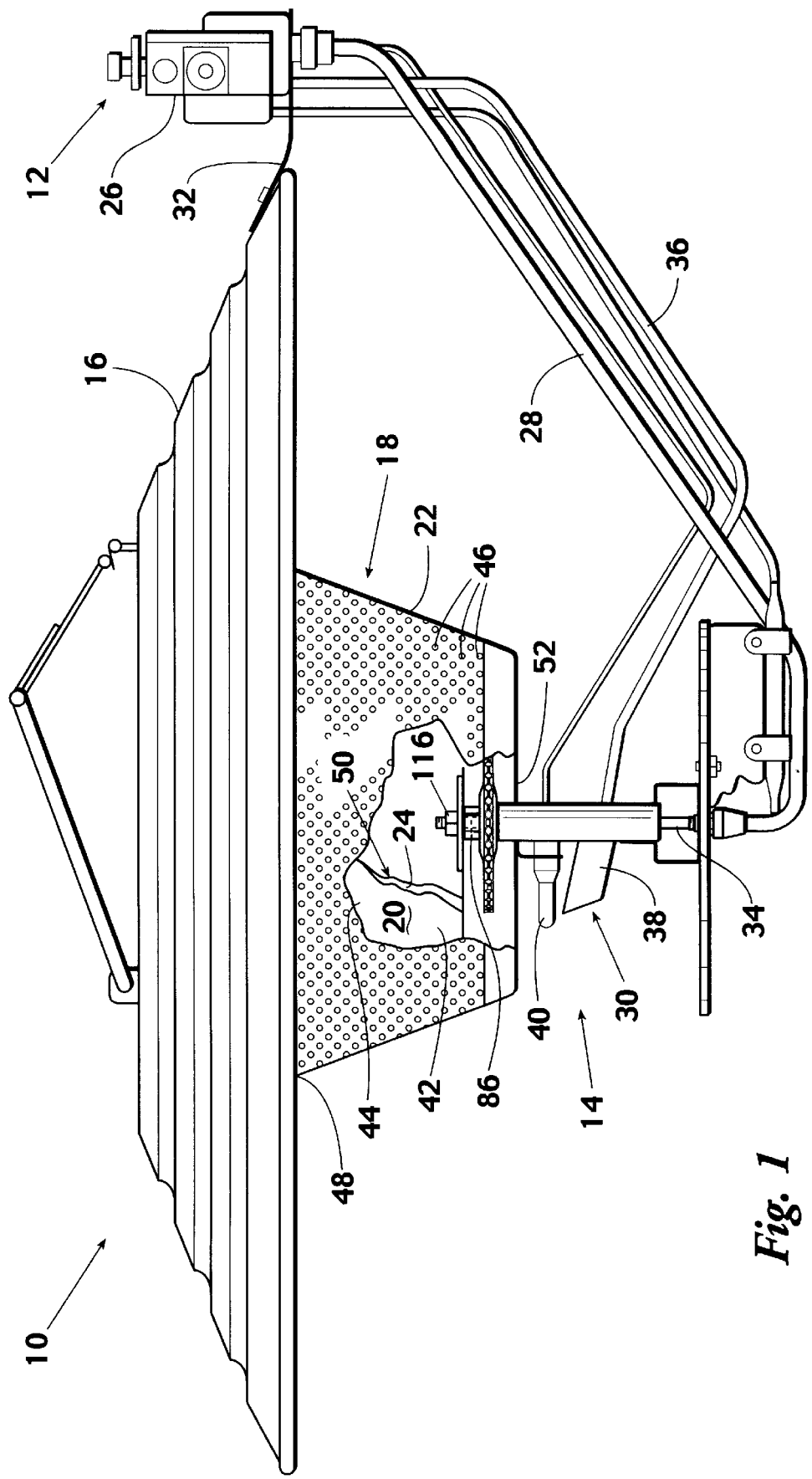
FIG. 1 is a side view partially in cross section of a radiant gas burner assembly.

Referring now to FIG. 1, shown is a radiant gas burner assembly or air-gas mixture burning radiant heater in accordance with the present invention and designated generally by the reference numeral 10. Gas burner assembly 10 comprises a gas supply system 12, gas burner 14, canopy or reflector 16, and radiation emitter 18 having core element or inner core 20, and radiant element or exterior hollow shell 22 having interior surface 24, said shell thereby being raised to infrared radiation emitting temperatures.

Gas supply system 12 comprises gas control valve 26, main gas supply tube 28 and pilot assembly 30. Gas control valve 26 is attached to canopy 16 using bracket 32 and receives gas from a gas supply source (not shown) that supplies gas to all of burner assemblies 10 located within a poultry house (not shown) or other typical structures. Main gas supply tube 28 extends between gas control valve 26 and burner orifice or orifice fitting 34 to supply gas to gas burner 14 for heating purposes. Pilot assembly 30 is attached to gas burner 14 and includes pilot tubing 36, a pilot burner 38 and thermocouple 40. Pilot burner 38 is attached to gas burner 14 by an attachment means (not shown). Pilot tubing 36 extends between pilot burner 38 and gas control valve 26 to provide gas for a pilot flame. Thermocouple 40 is positioned within the pilot flame and is in electrical communication with gas control valve 26 to control the supply of gas to both pilot burner 38 and gas burner 14 as is well known in the art.

Core element 20 comprises a solid metal frusto-conical cup-shaped housing 42 which is attached at its smaller end to gas burner 14. A layer of insulative material 44 is located along the inner surface of the side walls of housing 42 to direct heat towards radiant element 22. Radiant element 22 is also a frusto-conically shaped component manufactured from perforated metal, preferably corrosion-resistant metal, e.g. stainless steel, which defines a plurality of apertures 46. Apertures 46 are approximately 1/16 inch in diameter and are on approximately 1/8 inch centers. Core element 20, which is not perforated, is also preferably constructed of stainless steel and has a slightly greater flare angle than radiant element 22. Radiant element 22 is attached to upper end 48 of core element 20 and is positioned in a generally coaxial relationship with core element 20 to define a combustion chamber or narrow opening 50. In the preferred embodiment, narrow opening 50 is less wide at the top than at the bottom for flow of gas along interior surface 24 of radiant element 22. Lower end of radiant element 22 defines an aperture 52 which allows combustion air to enter narrow opening 50 as well as allowing access for the flame of pilot burner 38 to extend adjacent the outlet of gas burner 14. Canopy 16 is attached to the upper end of radiant element 22 and core element 20 using a plurality of brackets (not shown), and reflects heat downward toward the floor of the poultry house. When heated by burner 14 to high temperature over a substantial portion of its surface, radiant element 22 has a high emissivity for infrared waves and acts as an emitter to provide heat to the floor of the poultry house directly and by reflection of the infrared radiation by canopy 16.

Figure 2:
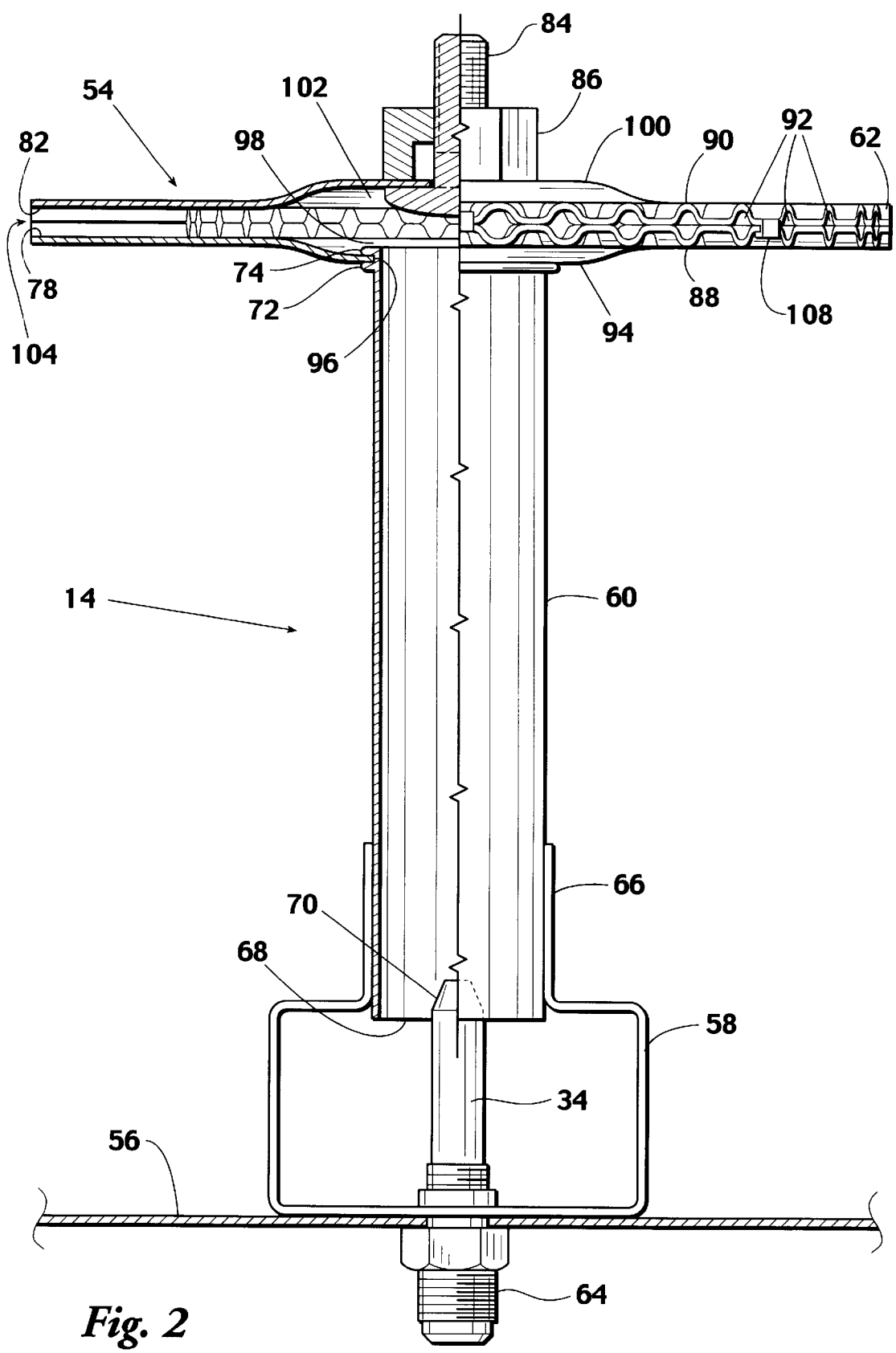
FIG. 2 is a side view in partial cross section of a gas burner of the present invention.
Figure 3:
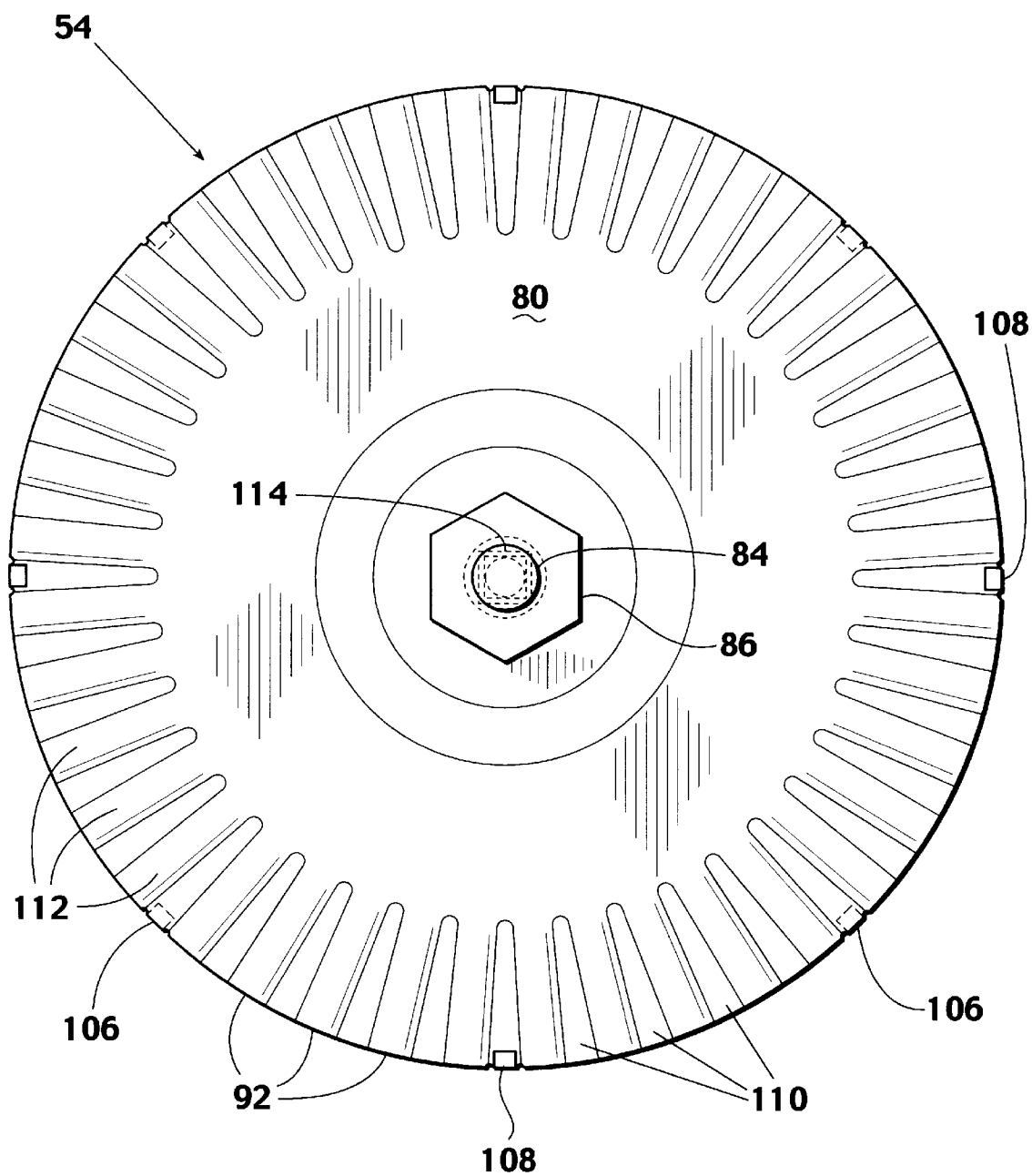
FIG. 3 is a top view of a burner head.

Referring now to FIGS. 2 and 3, gas burner 14 is a unique burner having burner head 54 fabricated from a metal stamping process. Gas burner 14 comprises burner pan 56, bracket 58, venturi tube 60, burner orifice or orifice fitting 34, and burner head 54 having periphery 62. Burner pan 56 is attached to gas fitting 64 which is attached to the end of main gas supply tube 28. Bracket 58 is attached to burner pan 56 and includes an upstanding flange 66 to which venturi tube 60 is attached. Disposed within bracket 58 and attached to gas fitting 64 such that it extends into venturi tube 60, is burner orifice 34. Burner orifice 34 delivers gas to gas burner 14 and directs gas from main gas supply tube 28 into venturi tube 60. Combustion air enters venturi tube 60 through the open ends of bracket 58 and through lower open end 68 of venturi tube 60 between burner orifice 34 and venturi tube 60.

The design of burner orifice 34 is such that it does not provide a settling station for airborne contaminants. Exterior surface 70 of burner orifice 34 forms an angle with respect to the axial center line of burner orifice 34 which is less than 30° and, in the preferred embodiment, is 23°. This relatively steep angle discourages the settling of particles which may drop down from inside venturi tube 60 on burner orifice 34, thereby affecting its performance.

Burner head 54 is attached to the end of venturi tube 60 opposite main gas supply tube 28. Burner head 54 abuts a formed lower bead 72 and is secured in place by a formed upper bead 74. Burner head 54 comprises a bottom plate or lower burner head 76 having a top surface 78, a top plate or upper burner head 80 having a bottom surface 82, a carriage bolt 84, and a spacer 86. In the preferred embodiment, top plate 80 and bottom plate 76 are formed of press-shaped sheet metal, preferably stainless steel.

Bottom plate 76 is a generally circular member having a plurality of air/fuel lower half ports 88 spaced equally around periphery 62 of bottom plate 76. A corresponding number of upper half ports 90 are formed around periphery 62 of generally circular top plate 80. The assembly of bottom plate 76 and top plate 80 aligns lower half ports 88 with upper half ports 90 to form a plurality of generally circular ports 92. In the preferred embodiment, there are thirty-six to forty-five lower half ports 88 and upper half ports 90 spaced apart by from 10° to 8°. However, the number of ports 88 and 90 can vary between 16 and 100. In the preferred embodiment, lower half ports 88 and upper half ports 90 are not exactly circular and have an effective inside diameter of approximately 3/16 inch.

The center of bottom plate 76 is dish-shaped and forms a generally flat bottom protrusion 94 which defines a generally circular central opening 96. Central opening 96 is designed to accept upper open end 98 of venturi tube 60 such that bottom plate 76 abuts lower bead 72. Once bottom plate 76 is assembled over venturi tube 60, upper bead 74 is formed to secure burner head 54 in place. Bottom protrusion 94 of bottom plate 76 and top protrusion 100 of top plate 80 form chamber 102 when bottom plate 76 and top plate 80 are secured together. Chamber 102 has a radius that is preferably at least one-third the radius of burner head 54. Additionally, when bottom plate 76 and top plate 80 are secured together, they form hollow interior 104.

Periphery 62 of bottom plate 76 and top plate 80 defines a plurality of slots 106 and tabs 108 alternately and evenly spaced on plates 76 and 80. In the preferred embodiment, there are four slots 106 spaced 90° from each other and four tabs 108 spaced 90° from each other and 45° from a respective slot 106. Slots 106 and tabs 108 on bottom plate 76 mate with an identical set of slots 106 and tabs 108 (visible in FIG. 3) formed on top plate 80 to secure bottom plate 76 and top plate 80 together mechanically without brazing or welding.

Individual lower half ports 88 formed on bottom plate 70 and upper half ports 90 formed on top plate 80 are preferably off-set by channels 110 positioned therebetween. Each channel 110 preferably has a length of at least one-half inch and a cross-sectional area not substantially greater than that of ports 92. The length of tubes 112 leading to lower half ports 88 and upper half ports 90 is approximately one inch. Also in the preferred embodiment, ports 92, formed from lower half ports 88 and upper half ports 90, should be of a relatively small area to inhibit flashback of the flame. However, ports 92 must be large enough such that small contaminants, such as down or small feather fragments, will pass through without clogging the ports.

Generally flat top protrusion 100, formed on the center on top plate 80, defines a generally square aperture 114. Square aperture 114 is designed to accept the square shoulder on carriage bolt 84 to prohibit its rotation with respect to top plate 80, thus allowing nut 116 to be tightened.

In practice, after bottom plate 76 is secured to venturi tube 60, carriage bolt 84 is inserted through square aperture 114 of top plate 80. Top plate 80 is then aligned with bottom plate 76 such that tabs 108 on top plate 80 are aligned with slots 106 on bottom plate 76. This in turn aligns tabs 108 on bottom plate 76 with slots 106 on top plate 80. Tabs 108 on both bottom plate 76 and top plate 80 then mate with their aligned slots 106 and secure top plate 80 to bottom plate 76 without brazing or welding.

Ports 92 are resistive to the collecting and build-up of dust and contamination due to their size and the fact that the precision metal stamping process for both top plate 80 and bottom plate 76 provides a very smooth interior surface. In addition, the control on the sizes of lower half ports 88 and upper half ports 90, and thus ports 92, provides accuracy for the performance characteristics of gas burner assemblies 10. While ports 92 are designed to be large in diameter to prevent clogging at the port face, they are resistant to flashback because the port wall depth is designed to be similar to the depth provided by the prior art cast iron burners. This resistance to flashback is of particular concern when propane gas is used because propane gas is currently the dominant fuel being used in burner assemblies for poultry houses. While the stamped or press-shaped plates 76 and 80 are a cost effective way to provide the smooth interior surface free of sharp edges, this could be achieved by other forming procedures such as precision machining or precision casting.

The present invention thus provides a much lighter weight burner having common upper and lower burner heads which are mechanically joined rather than brazed or welded to provide a very low overall cost burner which gives consistent performance between individual burners and is essentially maintenance free.

Whereas, the present invention has been described in relation to the drawings attached hereto, it should be understood that other and further modifications, apart from those shown or suggested herein, may be made within the spirit and scope of this invention.

What is claimed is:

1. An air-gas mixture burning radiant heater comprising:

a radiation emitter having an exterior hollow shell having a generally circular horizontal cross-section with a multiplicity of apertures therein and having a generally conical core element within said shell shaped to provide a narrow opening for flow of combustion product gases along the interior surface of said shell; and a burner head with a hollow interior and at least twenty ports for horizontal efflux of said air-gas mixture spaced substantially equally around the periphery thereof, said ports being positioned to direct combustion products of said air-gas mixture into said narrow opening between said core and said radiation emitter;

said burner head including a top plate and a bottom plate with a central opening therein to receive said air-gas mixture, the bottom of said top plate and the top of said bottom plate each having a smooth surface free from sharp edges and being shaped to form a chamber around said central opening having a height at least twice that of said ports and being shaped to form channels between each of said ports and said chamber, each said channel having a cross-sectional area not substantially greater than that of said ports and a length of at least one-half inch;

whereby the air-gas mixture entering said chamber is conducted substantially equally to said multiplicity of ports avoiding tendency to flashback while allowing free passage of small airborne particles.

2. Apparatus as recited in claim 1 wherein said at least twenty ports are from thirty-six to forty-five ports and are spaced apart by from 10° to 8°.

3. Apparatus as recited in claim 2 wherein the radius of said chamber is at least about one-third of the radius of said burner head.

4. Apparatus as recited in claim 1 wherein the radius of said chamber is at least about one-third of the radius of said burner head.

5. An air-gas mixture burning radiant heater comprising:

a radiation emitter having an exterior shell generally shaped in the form of a frustrum of a cone with a multiplicity of apertures therein and having a generally conical core element within said shell shaped to provide an opening narrower at the top than at the bottom for flow of combustion product gases along the interior surface of said shell;

a reflector positioned for directing radiation from said radiation emitter;

a burner head with a hollow interior and at least twenty ports for horizontal afflux of said air-gas mixture spaced substantially equally around the periphery thereof, said ports being positioned to direct hot combustion products of said air-gas mixture into said narrow opening between said core and said exterior shell;

said burner head including a generally circular top plate and a generally circular bottom plate with a central opening therein to receive said air-gas mixture, the bottom of said top plate and the top of said bottom plate each having a smooth interior surface free from sharp edges and being shaped to form a chamber around said central opening having a height at least twice that of said ports and being shaped to form channels between each of said ports and said chamber, each said channel having a cross-sectional area not substantially greater than that of said ports and a length of at least one-half inch; and a venturi tube having two open ends connected at one open end to said central opening and with a burner orifice at the other open end;

whereby air is drawn into said venturi tube with fuel gas from said orifice and the air-gas mixture is conducted substantially equally to said multiplicity of ports avoiding tendency to flashback while allowing free passage of small airborne particles.

6. Apparatus as recited in claim 5 wherein said at least twenty ports are from thirty-six to forty-five ports and are spaced apart by from 10° to 8°.

7. Apparatus as recited in claim 6 wherein the radius of said chamber is at least about one-third of the radius of said burner head.

8. Apparatus as recited in claim 5 wherein the radius of said chamber is at least about one-third of the radius of said burner head.

* * * * *